United States Patent
Hartsell

[15] 3,701,538
[45] Oct. 31, 1972

[54] COLLET ASSEMBLY
[72] Inventor: Joe L. Hartsell, P.O. Box 171, Casa Grande, Ariz. 85222
[22] Filed: Jan. 11, 1971
[21] Appl. No.: 105,179

[52] U.S. Cl. ...................................................279/30
[51] Int. Cl. ............................................B23b 31/22
[58] Field of Search...........279/30, 75, 22, 1 N, 1 SG

[56] References Cited

UNITED STATES PATENTS 1,760,860   5/1930   Minnier et al. ..............279/30

*Primary Examiner*—Gil Weidenfeld
*Attorney*—Warren F. B. Lindsley

[57] ABSTRACT

A clamping mechanism for a collet type chuck which is movable longitudinally in the clamping mechanism from a work clamping position to a work releasing position and employing a plurality of ball bearings movable laterally of the chuck for gripping and releasing the work.

4 Claims, 3 Drawing Figures

PATENTED OCT 31 1972

3,701,538

INVENTOR.
JOE L. HARTSELL
BY *Warren F.B. Lindsley*

ATTORNEY 3,701,538

COLLET ASSEMBLY

BACKGROUND OF THE INVENTION

This invention relates to chucks for machine tools and is particularly directed to an improved supporting and clamping mechanism or collet type chuck for automatic lathes and screw machines.

1. Field of the Invention

The supporting and clamping collect type collet is particularly provided for screw machines having work spindles through which the work piece is automatically moved longitudinally of the spindle and is clamped firmly in place periodically for machining purposes.

2. Description of the Prior Art

One of the problems of the prior art is that known internal collet chucking devices for moving and clamping the work in a screw machine employing expanding members to locate and hold the work, failed at times to hold the work firmly thereby permitting it to move back in the collet under machining pressure. This characteristic of the prior art resulted in waste being created since the parts machined automatically by the machine tool varied in size and configuration. Therefore, a need exists for a work guiding, moving and holding means of the collet chuck type which is simple to use and manufacture yet provides a positive work gripping action in one direction of movement of the work and unhindered, in fact, assisted movement of the work in the opposite direction through the work holding means.

SUMMARY OF THE INVENTION

In accordance with the invention claimed a new and improved collet type work holding means is provided which will expand and release the work in one direction of its movement through the spindle of the machine tool but firmly grips and stops the work in a predetermined opposite movement of the work through the machine tool.

It is, therefore, one object of this invention to provide an improved collet type holding means.

Another object of this invention is to provide an improved internal collet chucking device employing members which contract for locating and holding the work firmly when the work attempts to move in one direction and which expand and aid the movement of the work in an opposite direction.

A further object of this invention is to provide an improved collet holder which employs a ball bearing sleeve type collet mounted around the work for engaging and releasing the work.

A still further object of this invention is to provide an improved collet type chucking device employing a movable sleeve wherein a plurality of balls mounted in a race in the sleeve move into and out of engagement with the work depending on the position of the sleeve in the device to hold or release the work moving through it.

A still further object of this invention is to provide an economical, simple to manufacture and easy to use collet type chucking device.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which.

DESCRIPTION OF PREFERRED EMBODIMENT

Figure 1:
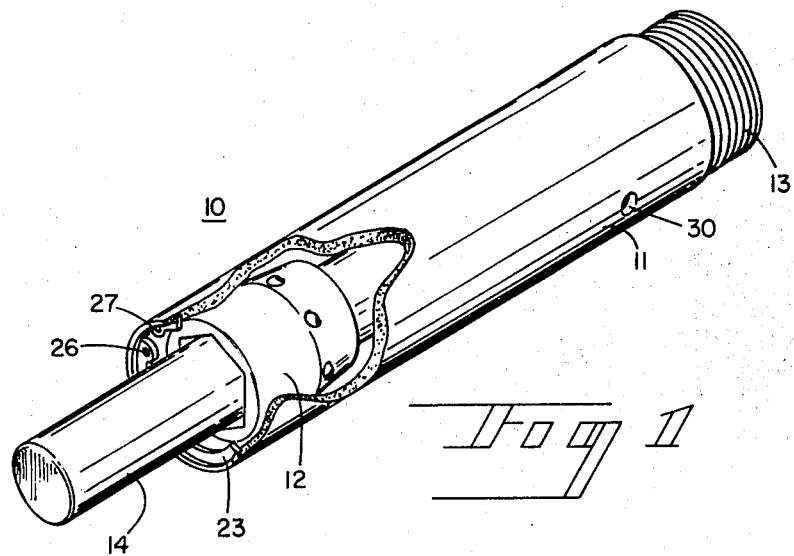
FIG. 1 is a perspective view partially broken away of a work holding means for attachment to the spindle of a lathe or screw machine showing a collet therein and embodying the invention.
Figure 2:
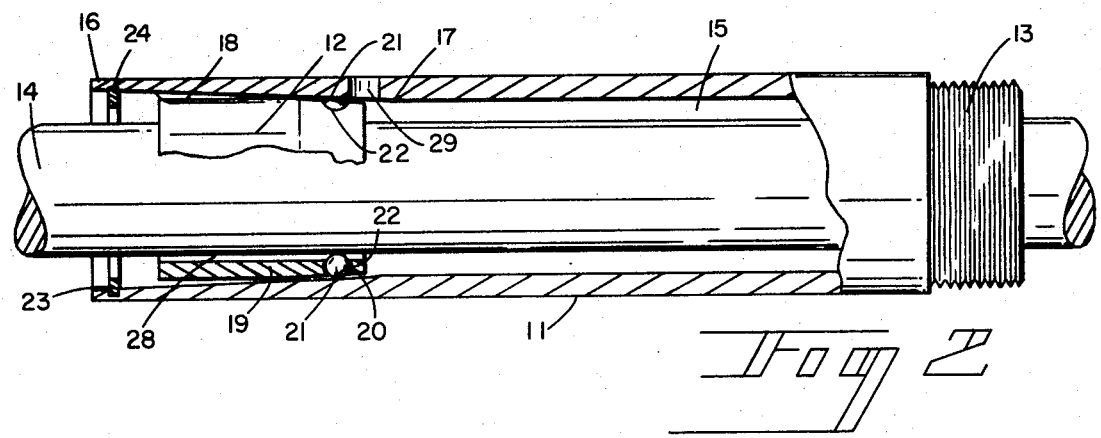
FIG. 2 is an enlarged longitudinal section, partially broken away of the structure shown in FIG. 1.
Figure 3:
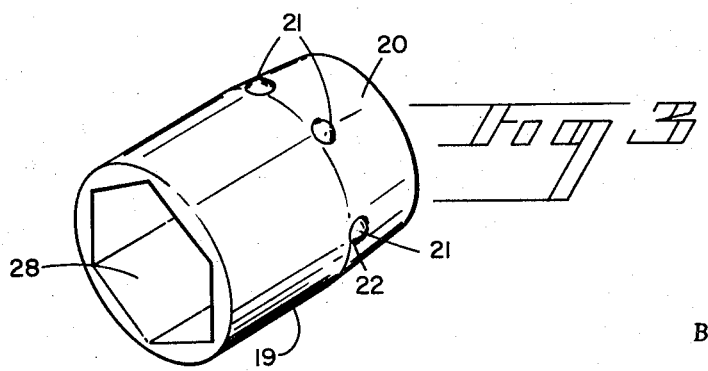
FIG. 3 is a perspective view of the collet shown in FIGS. 1 and 2.

Referring more particularly to the drawing by characters of reference, FIGS. 1 – 3 disclose a work supporting and clamping mechanism 10 for machine tools which comprises a supporting sleeve 11 for a collet type chuck 12. Sleeve 11 is threaded at one end 13 for mounting on a machine tool such as a lathe or screw machine. The mechanism 10 is particularly useful on a screw machine (not shown) having a work spindle through which the work piece 14 is automatically moved longitudinally thereof.

Sleeve 11 is threadedly attached to the machine tool and the work 14 is drawn or pushed through the sleeve. Sleeve 11 is provided with a bore 15 tapering inwardly of end 16 thereof to a point 17 intermediate its ends. Slidably mounted within sleeve 11 in the tapered portion 18 of its bore 15 is the collet type chuck 12 which comprises a collar type sleeve 19 tapered inwardly at one end 20. In the tapered end 20 is provided a plurality of balls 21 one seated in each of a plurality of apertures 22 spacedly arranged around the outer circumference of the tapered end to provide a race for each ball. The balls are freely movable laterally of sleeve 19 within the aperture forming its race.

As will be readily noted from FIG. 2 of the drawing, as sleeve 19 of collet type chuck 12 moves in the tapered portion 18 of bore 15 toward point 17, the balls 21 are forced inwardly of sleeve 19 in their races formed by apertures 22 against the work piece 14. As sleeve 19 is moved longitudinally in sleeve 11 toward its end 16, the balls 21 are moved outwardly in their races formed by apertures 22 in sleeve 19 and away from work piece 14. As noted the apertures 22 are concave, as shown in FIG. 2, so as to retain the balls within the confines of the opening but permitting some limited movement laterally of the collet.

A finger spring clamp 23 is mounted in an annular groove 24 arranged within end 16 of sleeve 11 to keep the collet type chuck 12 within sleeve 11. As readily noted from FIG. 1 of the drawing if the ends 26 and 27 of clamp 23 are forced toward each other the clamp will fall out of groove 24 and may be removed from sleeve 11 thereby making it possible to remove the collet type chuck 12 therefrom.

Although bore 28 of sleeve 19 of chuck 12 is of a given configuration and size, chucks 12 of different internal bore size and configuration but of the same outside configuration may be readily inserted in sleeve 11 and held therein by replacing clamp 23 in groove 24 in a well known manner.

An aperture 29 is provided in sleeve 11 adjacent the end of the path of travel inwardly of sleeve 19 so that sleeve 19 may be easily pushed out of sleeve 11 for replacement purposes when clamp 23 has been removed.

A pair of apertures 30 are diagonally provided in sleeve 11 adjacent its threaded end 13 for ease in attaching and removing sleeve 11 from a machine tool.

As noted from FIGS. 1 and 2 of the drawing as work piece 14 is moved from right to left through sleeve 11, its movement is unhindered by collet type chuck 12. In fact it is aided in its movement by the ball bearing action of balls 21 as sleeve 19 is moved toward end 16 of sleeve 11. The balls 21 move outwardly in their races in apertures 22 and aid the work piece in moving through sleeve 11 by rolling on the inside surface of bore 15 toward end 16 of sleeve 11.

Any reverse action of work piece 14 causes sleeve 19 of chuck 12 to move inwardly of sleeve 11 toward point 17 causing the balls 21 to be forced inwardly in their races in apertures 22 thereby firmly gripping the work piece 14 so that it can not move further toward end 13 of sleeve 11. Thus, free movement of work piece 14 is provided in one direction and very limited movement if any occurs in the reverse direction.

Although but one embodiment of the present invention has been illustrated and described, it will be apparent to those skilled in the art that various changes and modifications may be made therein without departing from the spirit of the invention or from the scope of the appended claims.

What is claimed is:

1. A collet assembly comprising:

a cylindrical sleeve for attachment at one end to a machine tool, said sleeve being provided with a bore extending longitudinally therethrough, said bore being tapered inwardly of said sleeve from its other end a predetermined distance to a given point intermediate its ends, a collet slidably mounted within the tapered end of said bore of said sleeve, said collet comprising a hollow sleeve provided with a work receiving bore, said hollow sleeve of said collet being tapered at one end inwardly of said collet in the same direction as the taper in said cylindrical sleeve, said tapered end of said sleeve of said collet being provided with a plurality of apertures spacedly arranged around its periphery and extending therethrough, said apertures each providing a race for a ball bearing, a ball bearing mounted one within each of said races, said collet moving in one direction in said cylindrical sleeve to release work passing through its bore and moving in said cylindrical sleeve in another direction to clamp and firmly hold the work passing through its bore, a groove formed around the inside periphery of said other end, and a resilient clamping ring-like member fitted within said groove, said ring-like member being less than a complete circle and having ends which may be moved toward each other to reduce its diameter to aid in removing said ring-like member from said groove.

2. The collet assembly set forth in claim 1 in further combination with an aperture arranged in said cylindrical sleeve adjacent said point to provide access to the inside end of said collet.

3. The collet assembly set forth in claim 1 wherein the walls defining said apertures are concave so as to hold said ball bearings within said apertures.

4. The collet assembly set forth in claim 3 wherein the walls defining said apertures have a radius of curvature a predetermined size larger than the radius of said ball bearings so as to provide lateral movement of said ball bearings in said hollow sleeve of said collet.

* * * * *